(12) United States Patent
Yamanaka et al.

(10) Patent No.: US 6,252,748 B1
(45) Date of Patent: Jun. 26, 2001

(54) THIN FILM MAGNETIC HEAD WITH WIDENING OUTER LAYER OF MULTI-LAYER POLE

(75) Inventors: Noboru Yamanaka, Saku; Kazumasa Fukuda; Yuzuru Iwai, both of Komoro, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/169,983

(22) Filed: Oct. 13, 1998

(30) Foreign Application Priority Data

Dec. 12, 1997 (JP) .................................................. 9-343472
Sep. 7, 1998 (JP) ................................................. 10-252083

(51) Int. Cl.⁷ ............................. G11B 5/39; G11B 5/31
(52) U.S. Cl. ........................................... 360/317; 360/126
(58) Field of Search .................................... 360/113, 126, 360/122, 121, 119, 120, 317

(56) References Cited

U.S. PATENT DOCUMENTS 5,438,747  8/1995  Krounbi et al. ...................... 360/113
5,452,164  9/1995  Cole et al. ............................ 360/113
5,600,519  2/1997  Heim et al. ........................... 360/126
5,831,801 * 11/1998 Shouji et al. ......................... 360/126

FOREIGN PATENT DOCUMENTS 7-225917   8/1995  (JP) .
7-262519  10/1995  (JP) .
8-249614   9/1996  (JP) .

* cited by examiner

*Primary Examiner*—Craig A. Renner
(74) *Attorney, Agent, or Firm*—Oblon, Spivak, McClelland, Maier & Neustadt, P.C.

(57) ABSTRACT

A gap film of a write element is provided between a first pole portion and a second pole portion. The second pole portion includes a third magnetic film and a fourth magnetic film. The third magnetic film is provided adjacent to the gap film and the fourth magnetic film is provided adjacent to the third magnetic film. The surface of the fourth magnetic film facing opposite the medium includes a first side adjacent to the third magnetic film and a second sides extending outward from the first side. The second sides each inclines toward the opposite side from the third magnetic film at an angle of less than 90° relative to an extended line of the first side to eliminate recording bleed occurring due to leaked magnetic field.

5 Claims, 8 Drawing Sheets

THIN FILM MAGNETIC HEAD WITH WIDENING OUTER LAYER OF MULTI-LAYER POLE

BACKGROUND OF THE INVENTION

1. Field of the Invention

The present invention relates to a thin film magnetic head, and more particularly to a combined type thin film magnetic head having a structure that exhibits improved areal density.

2. Discussion of Background

Most thin film magnetic heads employed in magnetic disk devices constituting computer storage apparatuses at present are the combined type that are provided with a thin film write element and a magnetoresistive (MR) read element. MR read elements, which are not dependent upon the speed relative to the magnetic disk, are capable of achieving a high degree of resolution. An MR read element includes a first shield film, a second shield film and an MR element. The first shield film and the second shield film are provided over a distance from each other via an appropriate non-magnetic insulator and the MR element is provided between the first shield film and the second shield film.

The write element, which is constituted of an inductive electromagnetic transducer, is laminated on the MR read element. An inductive thin film magnetic transducer to constitute the write element is provided with a first magnetic film which also functions as the second shield film for the MR read element, a second yoke, a gap film and a coil film supported by an insulating film and the like.

The front ends of the first magnetic film and the second yoke are respectively constituted of a first pole tip and a second pole tip that face opposite each other over the gap film having a very small thickness, and write operation is performed at the first and second pole tips. The first magnetic film and a second magnetic film are linked with each other so that their yokes complete a magnetic circuit at a back gap portion located on the opposite side from the first and second pole tips. The coil film is formed winding around the linking area of the yokes in a coil.

In order to support high recording density using this type of thin film magnetic head, the quantity of data stored per unit area of the magnetic disk (areal density) must be increased. An improvement in the areal density is achieved by improving the performance of the magnetic recording medium such as a magnetic disk and increasing the frequency at the write circuit as well as by improving the capability of the write element.

In one of the means for increasing the areal density by improving the capability of the write element, the gap length between the pole tips is reduced. However, since a reduction of the gap length leads to a reduction in the recording magnetic field intensity between the pole tips, there is naturally a limit to the degree to which the gap length can be reduced.

In another means for increasing the areal density, the number of data tracks that can be recorded at the magnetic disk is increased. The number of tracks that can be recorded at a magnetic disk is normally expressed as TPI (tracks per inch). The TPI capability of a write element may be enhanced by reducing the size of the head that determines the width of the data tracks. The head size is normally referred to as the head track width.

In the case of a conventional thin film magnetic head in the prior art described above, since the first magnetic film at the write element is also employed as the second shield film of the MR read element, the width of the first pole portion cannot be reduced, and consequently, a rather large side fringing magnetic field is generated during a recording operation. This magnetic field is caused by a leak of magnetic flux from the second pole tip whose width is reduced to the first magnetic film whose width is not reduced. Such a side fringing magnetic field restricts the lower limit of width that can be achieved and limits the degree to which the track density can be improved. In addition, it degrades the off-track performance when track data that have been written are read by the MR element.

As a means for eliminating the problem discussed above, Japanese Unexamined Patent Publication No. 262519/1995 and Japanese Unexamined Patent Publication No. 225917/1995 disclose a means for adjusting the width of the lower portion to the width of the second pole tip through ion beam milling.

In addition, U.S. Pat. No. 5,600,519 discloses a structure provided with a tapered portion between the zero throat point and an expanded portion at the first magnetic film and the second magnetic film.

Furthermore, U.S. Pat. No. 5,452,164 discloses a structure achieved by setting the width of the second yoke larger than the width of the second pole tip so that the two side surfaces of the second yoke in the widthwise direction project out from the two side surfaces of the second pole tip.

However, when the two side surfaces of the second yoke in its widthwise direction are made to project out from the two side surfaces of the second pole tip by setting the width of the second yoke larger than the width of the second pole tip, the magnetic field leaking through the edges of the pole tip in the widthwise direction increases to result in recording bleed due to the leaked magnetic field.

SUMMARY OF THE INVENTION

It is an object of the present invention to provide a separate type thin film magnetic head in which the yokes and the poles are separated.

It is a further object of the present invention to provide a thin film magnetic head with which recording bleed occurring due to leaked magnetic field is eliminated.

In order to achieve the objects described above, the thin film magnetic head according to the present invention is provided with at least one write element. In the write element, which includes a first pole portion, a second pole portion and a gap film, the gap film is provided between the first pole portion and the second pole portion. The second pole portion includes a third magnetic film which is provided adjacent to the gap film. Consequently, by using the third magnetic film as a pole tip and setting the head size that determines the width of the data tracks to very small dimensions determined by the width of the third magnetic film to improve the TPI capability, high density recording is achieved.

A fourth magnetic film included in the second pole portion is provided adjacent to the third magnetic film. By using the fourth magnetic film as a yoke, the magnetic flux which is required for a write operation can be supplied to the third magnetic film constituting the pole tip from the fourth magnetic film. In other words, according to the present invention, a separate type thin film magnetic head in which the pole tip is separated from the yoke can be achieved.

According to the present invention, the surface of the fourth magnetic film facing opposite the medium includes a first side which is adjacent to the third magnetic film and second sides which extend outward from at least one end of the first side. Each second side inclines toward the opposite side of the third magnetic film at an angle less than 90° relative to an extended line of the first side. Through this structure, any recording bleed occurring due to the leaked magnetic field generated through the edges of the fourth magnetic film can be eliminated.

In the thin film magnetic head according to the present invention, the second sides are normally provided at the two ends of the first side. The second sides should preferably incline at an angle equal to or greater than 45°.

According to the present invention, since the surface of the fourth magnetic film facing opposite the medium includes the second sides extending outward from at least one end of the first side, the width of the surface of the fourth magnetic film facing opposite the medium is set larger than the width of the surface of the third magnetic film facing opposite the medium, resulting in the fourth magnetic film projected out toward the outside relative to the third magnetic film at the two sides in the widthwise direction.

It is desirable that in the thin film magnetic head according to the present invention, the first pole portion include a first magnetic film and a second magnetic film. The second magnetic film is provided adjacent to the gap film, whereas the first magnetic film is provided adjacent to the second magnetic film. By combining this structure for the first pole portion and the structure of the second pole portion described earlier, a structure which is achieved by providing the first magnetic film, the second magnetic film, the gap film, the third magnetic film and the fourth magnetic film adjacent to each other in this order is realized. By adopting this structure, in which the second magnetic film and the third magnetic film among the four magnetic films, i.e., the first magnetic film to the fourth magnetic film, are employed as pole tips, the head size which determines the width of the data tracks can be set very small, determined by the widths of the second magnetic film and the third magnetic film to increase the TPI capability so that high density recording can be achieved.

In addition, the first magnetic film and the fourth magnetic film may be extended toward the rear from the pole portions to constitute yokes with the portions extended toward the rear. In this structure, a magnetic flux sufficient for a write operation is supplied from the first magnetic film and the fourth magnetic film constituting the yokes to the second magnetic film and the third magnetic film constituting the pole tips.

The thin film magnetic head according to the present invention normally includes an MR read element. In the MR read element, which includes a first shield film, a second shield film and an MR element, the first shield film and the second shield film are provided over a distance from each other with the MR element located between the first shield film and the second shield film. The write element is laminated on the MR read element. In this structure, the second shield film also functions as the first magnetic film of the write element to achieve a reduction in thickness.

BRIEF DESCRIPTION OF THE DRAWINGS

Other objects, structural features and advantages of the present invention are explained in further detail by referring to the attached drawings illustrating preferred embodiments of the present invention.

DETAILED DESCRIPTION OF THE PREFERRED EMBODIMENTS

Figure 1:
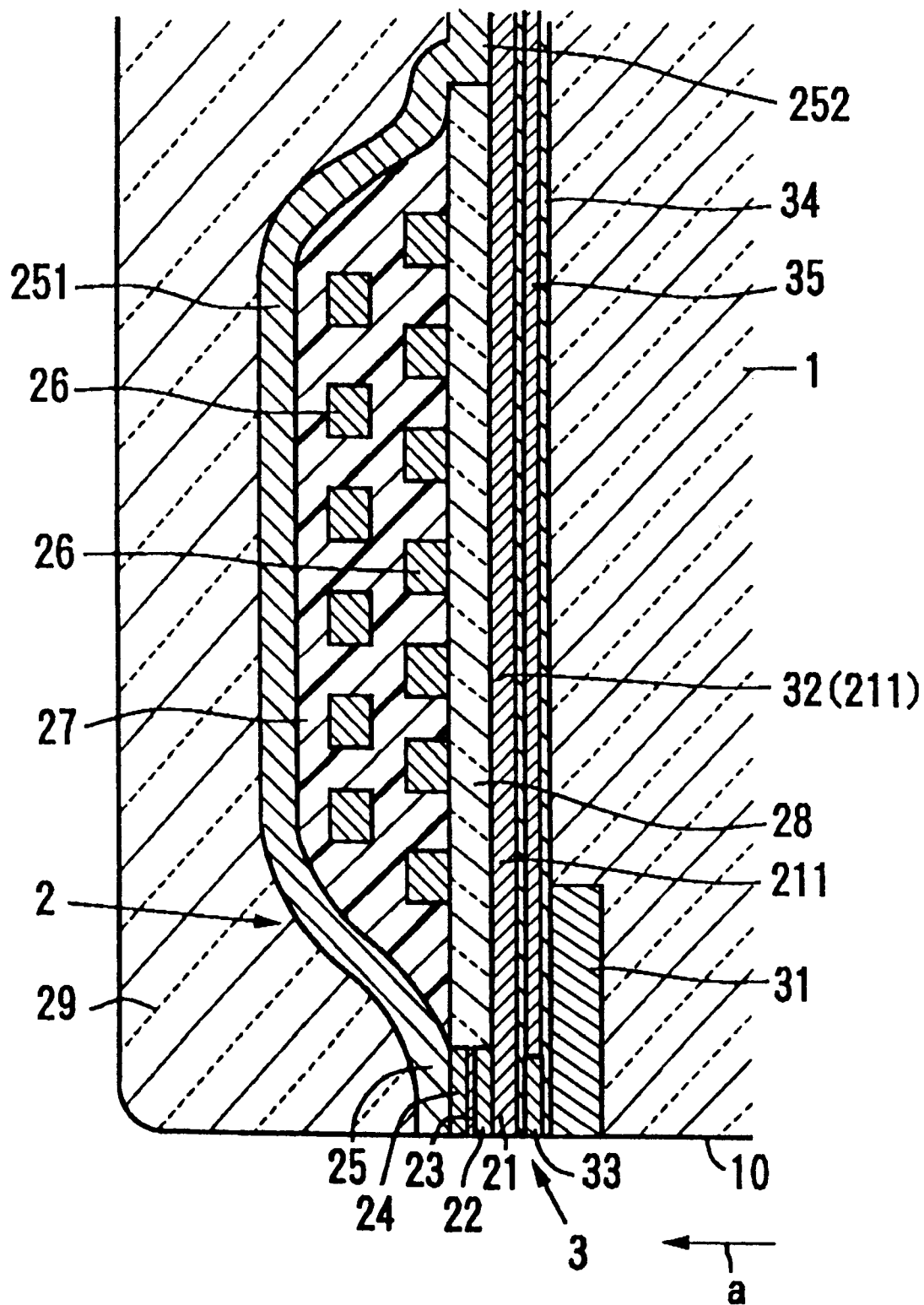
FIG. 1 is a sectional view of the thin film magnetic head according to the present invention.
Figure 2:
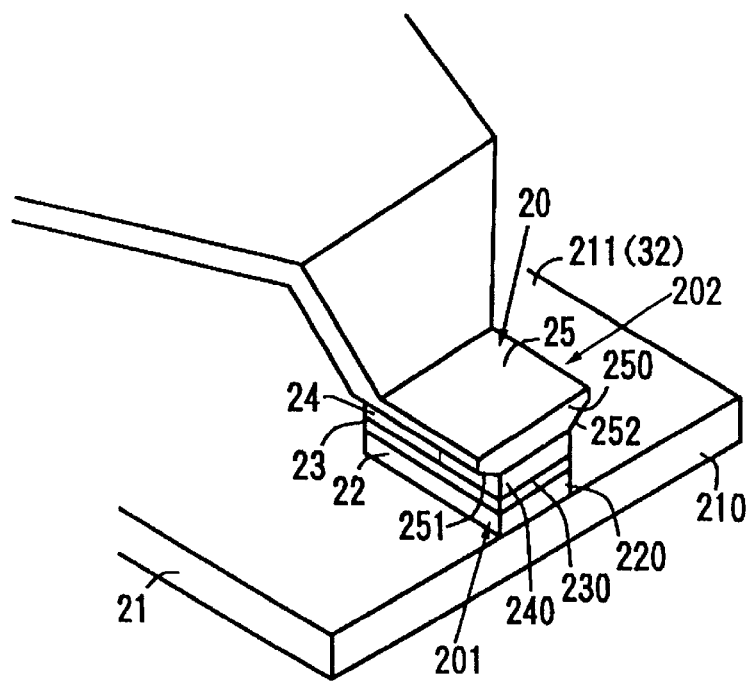
FIG. 2 is an enlarged perspective of the pole portion of the thin film magnetic head illustrated in FIG. 1.
Figure 3:
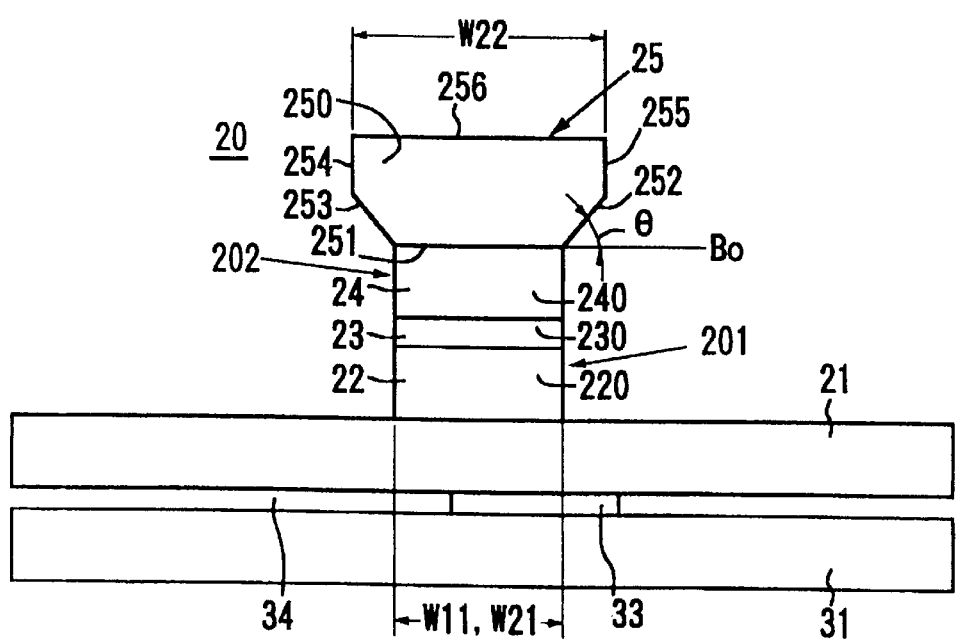
FIG. 3 is an enlarged frontal view of the pole portion illustrated in FIG. 1.

Referring to FIGS. 1 to 3, the combined type thin film magnetic head is provided with both a write element 2 and an MR read element 3. The write element 2 and the MR read element 3 are formed on a base body 1 which is employed as a slider, with the read/write area located at an air bearing surface (hereafter referred to as an ABS) 10 of the base body 1. The arrow "a" indicates the direction in which the magnetic recording medium rotates (the direction of airflow).

The write element 2, which is constituted of an inductive thin film magnetic transducer, is laminated on the MR read element 3. However, a structure in which the MR read element 3 is provided on the write element 2 may be adopted, instead.

The write element 2 is provided with a pole portion 20. As FIGS. 2 and 3 illustrate, the pole portion 20 includes a first pole portion 201, a second pole portion 202 and a gap film 23. The gap film 23 is provided between the first pole portion 201 and the second pole portion 202. The second pole portion 202 includes a third magnetic film 24 which is provided adjacent to the gap film 23. As a result, the third magnetic film 24 may be employed as a pole tip to set the head size, which determines the width of the data tracks very small, determined by the width of the third magnetic film 24 so that the TPI capability can be improved to achieve high density recording.

A fourth magnetic film 25 which is included in the second pole portion 202 is provided adjacent to the third magnetic film 24. By using the fourth magnetic film 25 as a yoke, the magnetic flux required for write operations can be supplied from the fourth magnetic film 25 to the third magnetic film 24 constituting the pole tip. In other words, according to the present invention, a separate type thin film magnetic head in which a pole tip is provided separate from a yoke can be provided.

In the embodiment, the first pole portion 201 includes a first magnetic film 21 and a second magnetic film 22. The second magnetic film 22 is provided adjacent to the gap from 23, whereas the first magnetic film 21 is provided adjacent to the second magnetic film 22.

The first magnetic film 21 to the fourth magnetic film 25 may be constituted of permalloy under normal circumstances. The gap film 23 may be constituted of a metal oxide such as $Al_2O_3$, $SiO_2$ or the like or it may be constituted of a nitride such as AlN, BN, SiN or the like. Alternatively, it may be constituted of a conductive non-magnetic material such as Au, Cu, or NiP.

In the structure described above, the second magnetic film 22 and the third magnetic film 24 of the four magnetic films, i.e., the first magnetic film 21 to the fourth magnetic film 25, are used as pole tips so that the head size, which determines the width of the data tracks can be set at a minute dimension determined by the widths W11 and W21 of the second magnetic film 22 and the third magnetic film 24 respectively, which achieves an improvement in the TPI capability to achieve high density recording. In the embodiment, the second magnetic film 22 is provided projecting out above the first magnetic film 21, with the gap film 23 laminated on the second magnetic film 22. In addition, the third magnetic film 24 is laminated on the gap film 23. The width W11 of a surface 220 of the second magnetic film 22 facing opposite the medium and the width W21 at a surface 240 of the third magnetic film 24 facing opposite the medium are almost equal to each other.

At the same time, the first magnetic film 21 and the fourth magnetic film 25 among the four magnetic films, i.e., the first magnetic film 21 to the fourth magnetic film 25, extend rearward from the pole portion 20, with the portions extending rearward constituting yokes 211 and 251 respectively. In this specification, "rearward" means the direction opposite from the surfaces facing opposite the medium.

The yokes 211 and 251 constituted by the first magnetic film 21 and the fourth magnetic film 25 respectively are linked with each other at a rear linking portion 252, to complete a thin film magnetic circuit. A coil film 26 winds around the linking portion 252 in a coil, and the coil film 26 is supported by an insulating film 27. The number of turns and the number of layers of the coil film 26 are arbitrary. This structure makes it possible to supply magnetic flux required for a write operation from the first magnetic film 21 and the forth magnetic film 25 respectively constituting the yokes 211 and 251 to the second magnetic film 22 and the third magnetic film 24 constituting pole tips. In other words, a separate magnetic pole type magnetic head in which pole portions are separated from the yokes can be achieved.

A surface 250 of the fourth magnetic film 25 facing opposite the medium includes a first side 251 adjacent to the third magnetic film 24 and second first sides 252 and 253 extending outward from the two ends of the first side 251. The second sides 252 and 253 incline toward the opposite side of the third magnetic film 24 at an angle θ which is less than 90° relative to an extended line Bo of the first side 251. Through this structure, in which the edges of the fourth magnetic film 25 are cut off by the second sides 252 and 253, any recording bleed occurring due to magnetic field leaking through the edges can be eliminated.

In the embodiment, the surface 250 of the fourth magnetic film 25 facing opposite the medium is formed in a hexagonal shape having the first side 251, the second sides 252 and 253, lateral sides 254 and 255 and an upper side 256. This hexagonal shape is maintained over almost the entire length of the fourth magnetic film 25 at the pole portion 20. The width of the first side 251 is set at W21 which is the same as the length of a first side (upper side) of the third magnetic film 24, and the second sides 252 and 253 are provided at the two ends of the first side 251. It is desirable that the second sides 252 and 253 incline at an angle equal to or greater than 45°.

Figure 4:
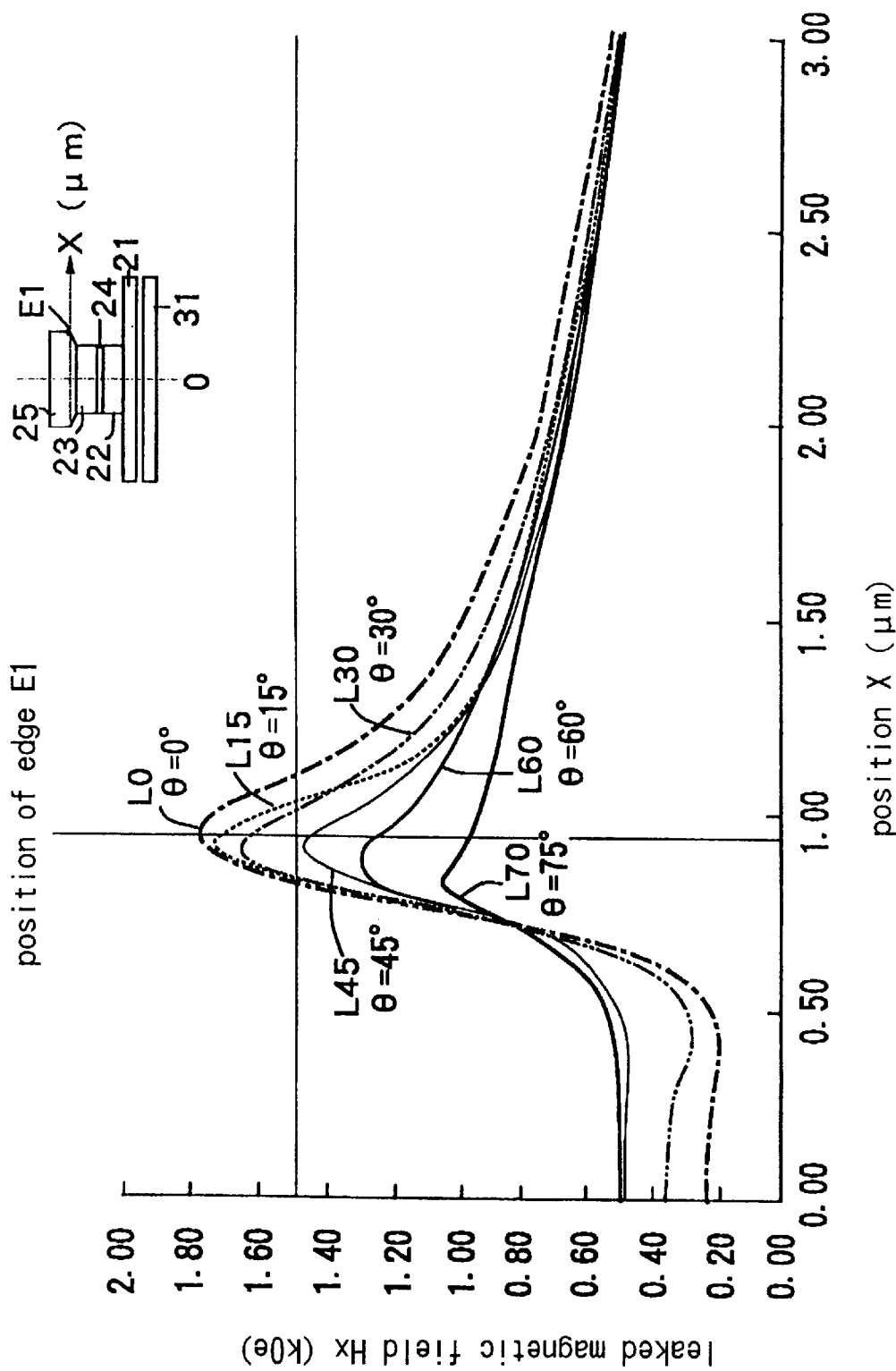
FIG. 4 is a graph illustrating the relationship between the position X ($\mu$m) and the leaked magnetic field Hx (kOe)
Figure 5:
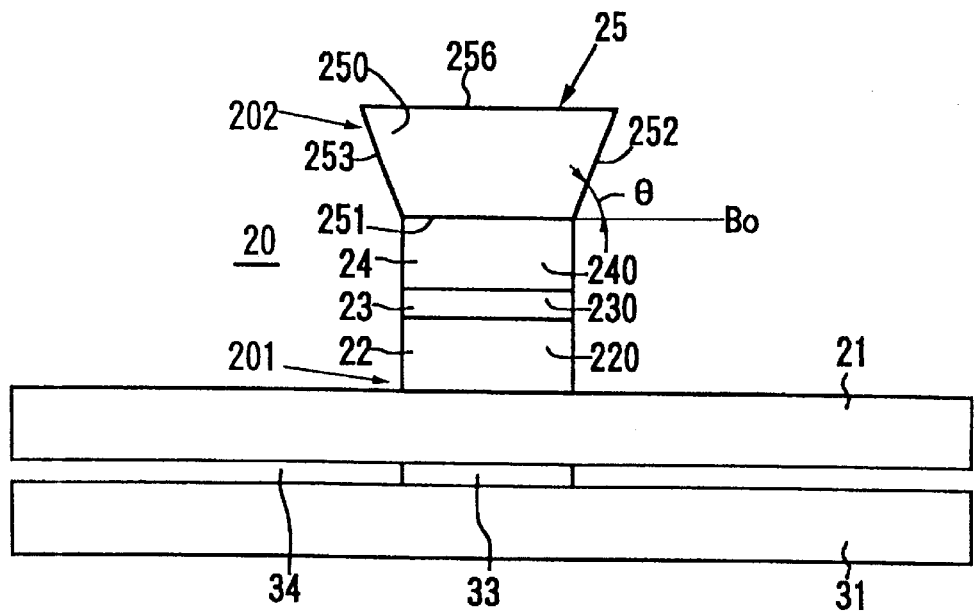
FIG. 5 illustrates another embodiment of the pole portion that may be employed in the thin film magnetic head according to the present invention.

FIG. 4 presents data that illustrate the relationship between the position X ($\mu$m) and the leaked magnetic field Hx (kOe). As illustrated in FIG. 4, the position X is a position taken in the direction X of the track width, relative to the center 0 of the track width at the pole portion 20 (0 $\mu$m). In FIG. 4, characteristics curves (L0, L15, L30, L45, L60 and L75) achieved by using the angle of inclination θ (0°, 15°, 30°, 45°, 60° and 75°) of the second sides 252 and 253 as a parameter are presented.

As illustrated in FIG. 4, as the angle of inclination θ increases, the leaked magnetic field intensity at an edge E1 becomes reduced. This means that the leaked magnetic field at the edge E1 can be effectively reduced by increasing the angle of inclination θ. However, problems arise as the angle of inclination θ becomes close to 90°, in that edges appear again, in that the width W22 of the fourth magnetic film 25 becomes equal to the width W21 of the third magnetic film 24 to cancel out the advantages (to be detailed later) achieved by projecting out the fourth magnetic film 25 relative to the third magnetic film 24, and the like. Thus, the angle of inclination θ of the second sides 252 and 253 must be less than 90°.

Next, in consideration of application in combination with a magnetic recording medium (magnetic disk), it is desirable to ensure that the leaked magnetic field at the edge E1 does not exceed 1.5 (kOe), since the magnetic recording medium typically as a coercivity of approximately 2.5 (kOe) and it is necessary to keep the leaked magnetic field intensity lower than the coercivity by approximately 1 (kOe) in order to be able to disregard the influence of a write occurring due to the magnetic field leaking through the edge E1 on the magnetic recording medium. FIG. 4 indicates that the angle of inclination θ at which the leaked magnetic field at the edge E1 does not exceed 1.5 (kOe) is 45° or greater.

According to the present invention, the width W22 of the surface 250 of the fourth magnetic film 25 facing opposite the medium is larger than the width W21 of the surface 240 of the third magnetic film 24 facing opposite the medium so that the fourth magnetic film 25 projects out toward the outside relative to the third magnetic film 24 at both sides in the widthwise direction. A width difference ΔW1=(W22−W21)/2 manifesting at both sides of the surfaces 240 and 250 facing opposite the medium due to the difference between the width W22 and the width W21 of the surface 240 of the third magnetic film 24 facing opposite the medium is equal to or less than 0.3 $\mu$m. In the range over which the width difference ΔW1 is equal to or less than 0.3 $\mu$m, the magnetic field leaking from the two ends of the fourth magnetic film 25 in its widthwise direction can be reduced to a small value equal to or less than 2.0 (kOe).

The width W21 of the surface 240 of the third magnetic film 24 facing opposite the medium can be set less than 2.0 $\mu$m to improve the track density. Such a small pole width can only be realized by constituting the thin film magnetic head according to the present invention as a separate magnetic pole type and is a great advantage of the separate magnetic pole type. It is difficult to achieve such a minute pole width in a thin film magnetic head in the prior art of a non-separate magnetic pole type.

The surfaces 210, 220, 230, 240 and 250 all facing opposite the medium and belonging to the first magnetic film 21, the second magnetic film 22, the gap film 23, the third magnetic film 24 and the fourth magnetic film 25 respectively, constitute a single flat surface. The flat surface constituted of the surfaces 210 to 250 facing opposite the medium constitutes a portion of the ABS 10. The second magnetic film 22, the gap film 23 and the third magnetic film 24 constitute a rear wall surface which is essentially a single flat surface on the side opposite from the surfaces 220 to 240 facing opposite the medium. This rear wall surface is essentially parallel to the ABS surface 10 constituted by the surfaces facing opposite the medium.

The area around the first magnetic film 21, the third magnetic film 24 and the gap film 23 is filled with a non-magnetic insulating film 28 (see FIG. 1). The upper surface of the non-magnetic insulating film 28 is flattened to form a flat surface that is essentially one and the same surface as the surface of the third magnetic film 24. The non-magnetic insulating film 28 may be constituted of $Al_2O_3$, $SiO_2$ or the like. Reference number 29 indicates a protective film which covers the entire structure and is constituted of $Al_2O_3$, $SiO_2$ or the like.

The second magnetic film 22 and the third magnetic film 24 are normally constituted of Permalloy. In another mode, at least either the second magnetic film 22 or the third magnetic film 24 may be constituted of a material having a higher saturation magnetic flux density compared to that of Permalloy. In this case, satisfactory recording performance is achieved even with a magnetic recording medium having a high coercivity. A high saturation magnetic flux density material having a higher saturation magnetic flux density compared to that of Permalloy should be selected for this purpose. For instance, at least one substance selected from Fe—Co, Fe—M and Fe—Co—M may be used. In this context, M represents at least one substance selected from N, C, B, Si, Al, Ti, Zr, Hf, Mo, Ta and Nb (all chemical symbols). The second magnetic film 22 and the third magnetic film 24 may both be constituted of the high saturation magnetic flux density material described above or only either one of them may be constituted of the high saturation magnetic flux density material.

In addition, at least either the first magnetic film 21 or the fourth magnetic film 25 may be constituted of a material having a higher resistivity compared to that of Permalloy. This structure will reduce the eddy current loss compared to a structure employing Permalloy, when the frequency is increased at the write circuit. Specific examples of the high resistivity material include at least one substance selected from Fe—Co amorphous, Fe—M—N, Fe—M—O, Fe—Co—M—N , Fe—Co—M —O and Fe—Co—N. In this context, M represents at least one substance selected from B, Si, Al, Ti, Zr, Hf, Mo, Ta and Nb (all chemical symbols). Both the first magnetic film 21 and the fourth magnetic film 25 may be constituted of the high resistivity material described above or only either one of them may be constituted of the high resistivity material.

In FIG. 1, the MR read element 3 includes a first shield film 31, a second shield film 32, an MR element 33 and a lead conductor film 35. The first shield film 31 and the second shield film 32 are provided over a distance from each other, with the MR element 33 provided between the first shield film 31 and the second shield film 32. The second shield film 32 constitutes the first magnetic film 21 of the write element 2. A non-magnetic insulating film 34 is provided between the first shield film 31 and the second shield film 32, with the MR element 33 and the lead conductor film 35 provided inside the non-magnetic insulating film 34.

The write element 2 is laminated onto the MR read element 3. In this structure, the second shield film 32 also functions as the first magnetic film 21 of the write element 2. Since the second magnetic film 22 projects out over the first magnetic film 21, the width W11 of the second magnetic film 22 can be reduced to a great degree while maintaining the width of the second shield film 32 to dimensions required to protect the MR read element 3.

According to the present invention, various types of inductive thin film magnetic transducers that have been proposed to date and that will be proposed in the future may be employed to constitute the write element 2. In addition, various types of read elements that have been proposed to date and that will be proposed in the future including those using a magnetic anisotropic magnetoresistive film such as a Permalloy film and those utilizing the giant magnetoresistance effect by employing a spin valve film, a tunnel junction effect film or the like, may be used to constitute the MR read element 3. The write element 2 and the MR read element 3 are mounted on a slider. The slider may be provided with one or more rails, or a slider without rails may be employed.

Next, in reference to FIGS. 5 to 10, other embodiments of the thin film magnetic head according to the present invention are explained. First, in the embodiment illustrated in FIG. 5, the surface 250 of the fourth magnetic film 25 facing opposite the medium is formed in a trapezoidal shape with the second sides 252 and 253 that are continuous to the two ends of the first side 251 extending to the upper side 256. The lateral sides 254 and 255 in the embodiment illustrated in FIGS. 2 and 3 are not present.

Figure 6:
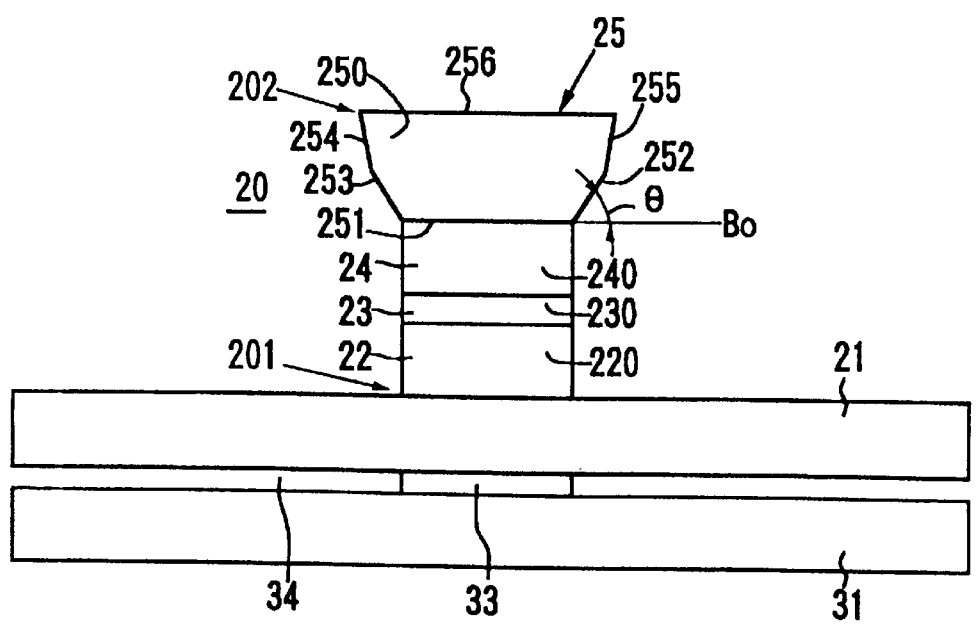
FIG. 6 illustrates yet another embodiment of the pole portion that may be employed in the thin film magnetic head according to the present invention.

In the embodiment illustrated in FIG. 6, the lateral side 255 continuous to the second sides 252 and the lateral side 254 continuous to the second sides 253, too, incline at an angle less than 90° relative to the first side 251.

Figure 7:
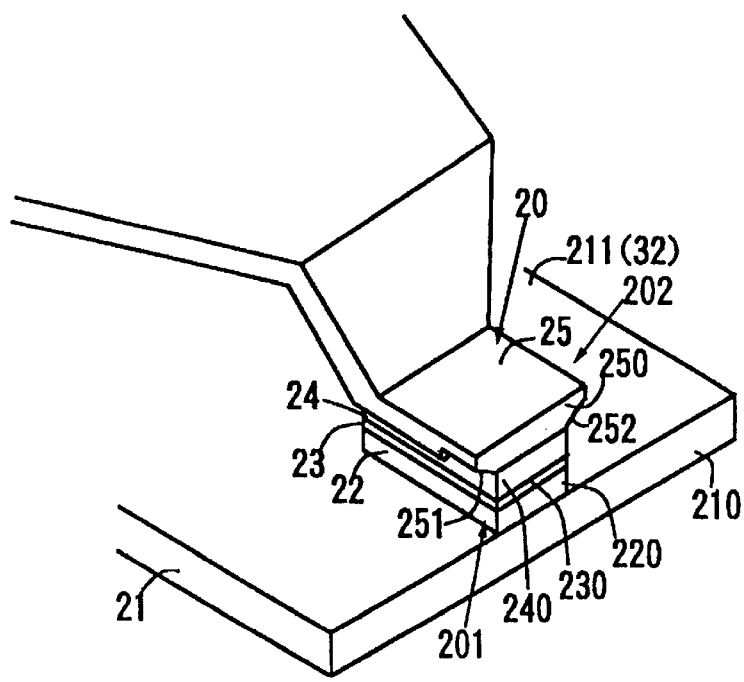
FIG. 7 is a perspective illustrating yet another embodiment of the pole portion that may be employed in the thin film magnetic head according to the present invention.
Figure 8:
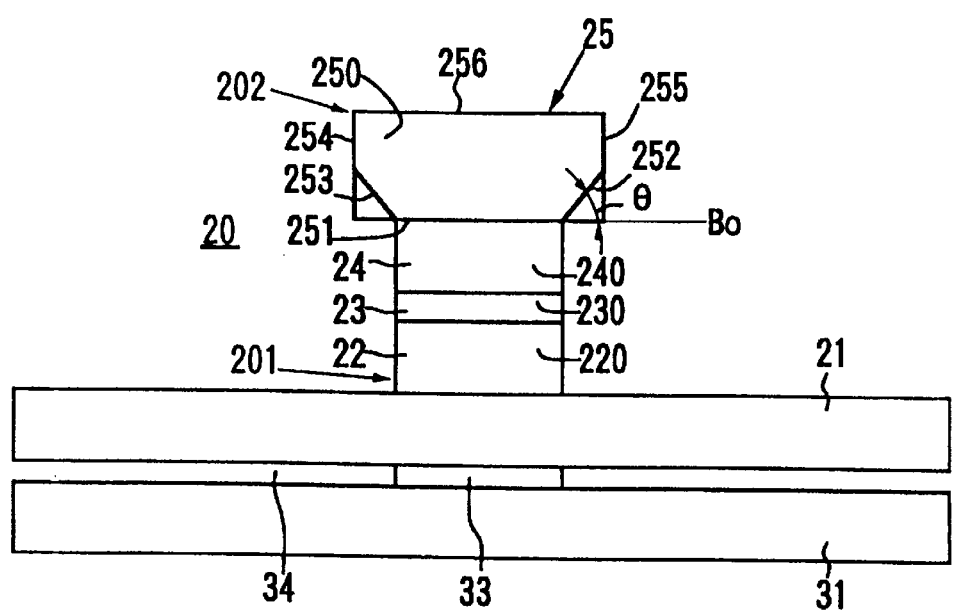
FIG. 8 is an enlarged frontal view of the pole portion illustrated in FIG. 7.

In the embodiment illustrated in FIGS. 7 and 8, while the surface 250 of the fourth magnetic film 25 facing opposite the medium is formed in a hexagonal shape, the hexagonal shape ends in the middle area toward the rear from the surface 250 at the fourth magnetic film 25 facing opposite the medium.

Figure 9:
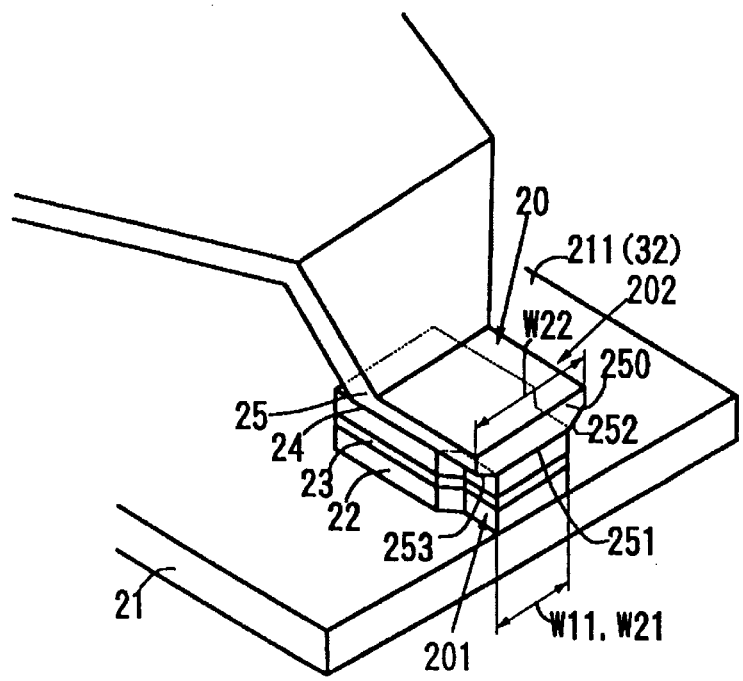
FIG. 9 is a perspective illustrating another structure for the pole portion in the thin film magnetic head according to the present invention.
Figure 10:
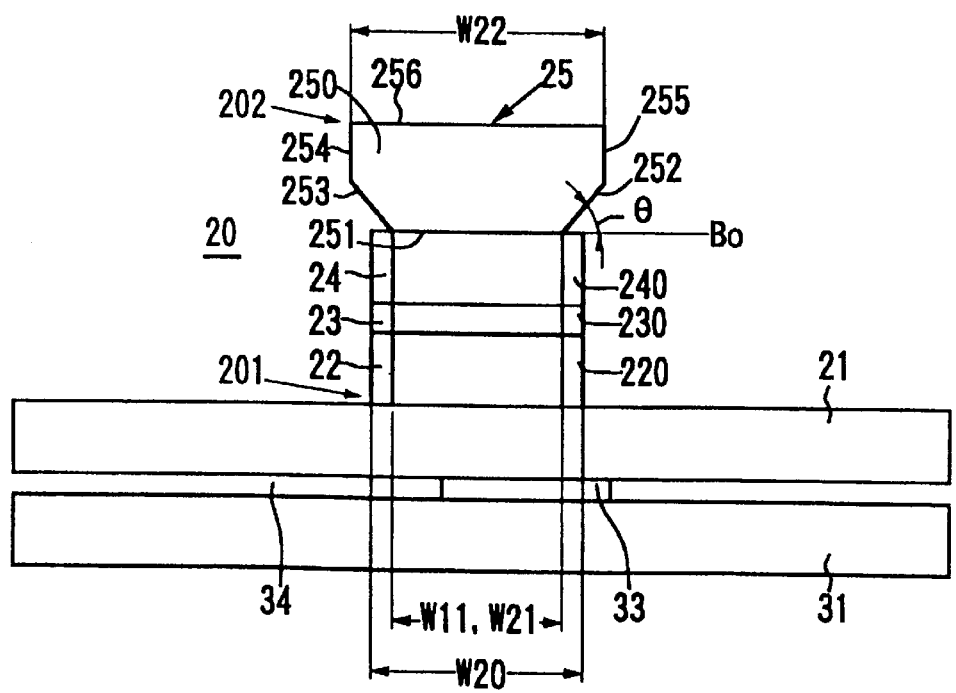
FIG. 10 is an enlarged frontal view of the pole portion illustrated in FIG. 9.
Figure 11:
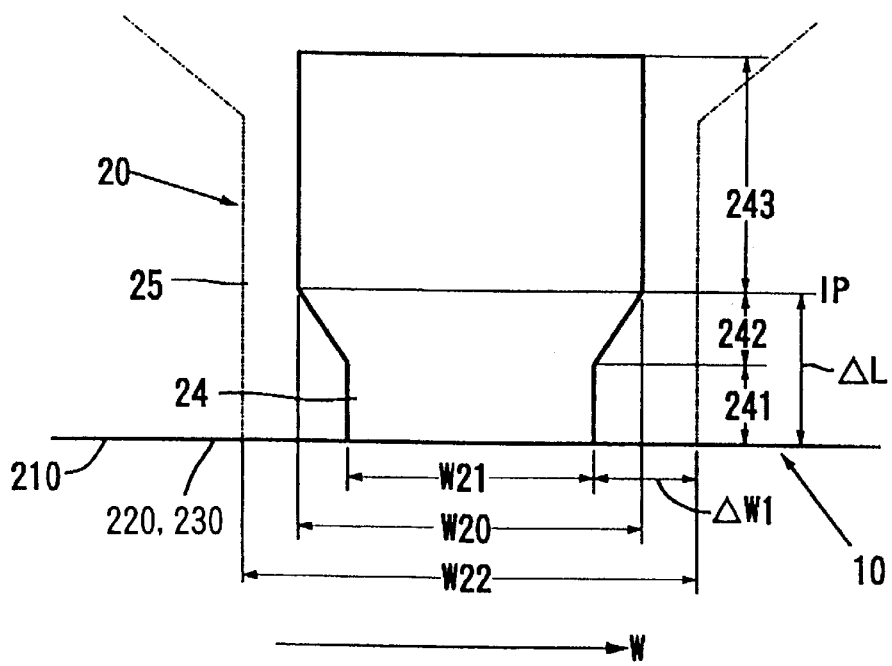
FIG. 11 is an enlarged plan view of the pole portion illustrated in FIG. 9.

FIG. 9 is a perspective illustrating another structure for the pole portion of the thin film magnetic head according to the present invention, FIG. 10 is an enlarged frontal view of the pole portions illustrated in FIG. 9 and FIG. 11 is an enlarged plan view of the pole portions illustrated in FIG. 9. This embodiment is characterized in that the third magnetic film 24 has a width W20 which is larger than the width W21 at the surface 240 facing opposite the medium, at the position receding from the surface 240 facing opposite the medium. Through this structure, magnetic saturation can be prevented from occurring at the pole tip constituted of the third magnetic film 24 to prevent degradation of the recording magnetic field pitch and recording bleed occurring due to leaked magnetic field.

It is desirable that the width ratio (W20/W21) of the width W20 and the width W21 satisfy $1.2 \leq (W20/W21) \leq 1.8$. Within this range, a high degree of write magnetic field intensity can be achieved, whereas the write magnetic field intensity is reduced remarkably outside this range.

In addition, the receding quantity ΔL representing the distance from the surface facing opposite the medium to the position at which the width is increased to the width W20 be within a range of 0.2 to 0.8 μm. Within this range, a sufficient write magnetic field intensity can be assured for magnetic recording, whereas the write magnetic field intensity is drastically reduced outside this range.

Figure 12:
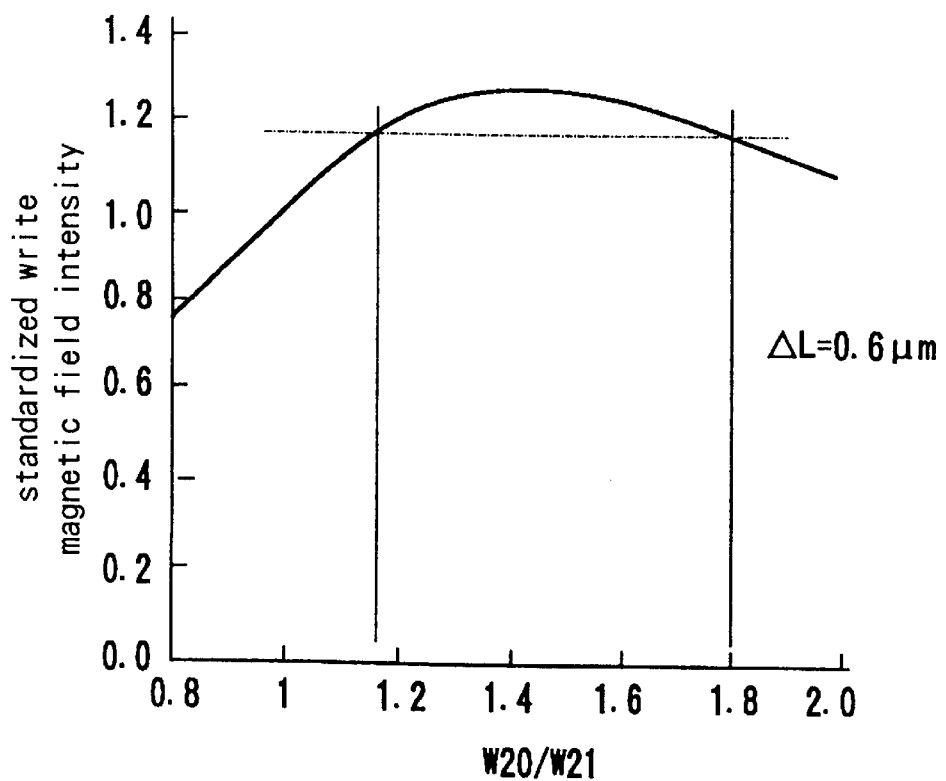
FIG. 12 is a graph illustrating the relationship between the width ratio (W20/W21) and the standardized write magnetic field intensity.

FIG. 12 presents data illustrating the relationship between the width ratio (W20/W21) and the standardized write magnetic field intensity. The data presented in FIG. 12 were obtained with the receding quantity ΔL set at 0.6 μm. The data in FIG. 12 indicate that write magnetic field intensity characteristics that achieve an upward arching curve are obtained within the range of 1.2≦(W20/W21)≦1.8 to assure a high write magnetic field intensity. As the width ratio (W20/W21) becomes less than 1.2, the standardized magnetic field intensity becomes drastically reduced. As the width ratio (W20/W21) becomes larger than 1.8, the write magnetic field intensity becomes reduced remarkably, too. Although not shown, data indicating a similar tendency to that in FIG. 12 were obtained with the receding quantity ΔL set at 0.2 μm and 0.8 μm.

Figure 13:
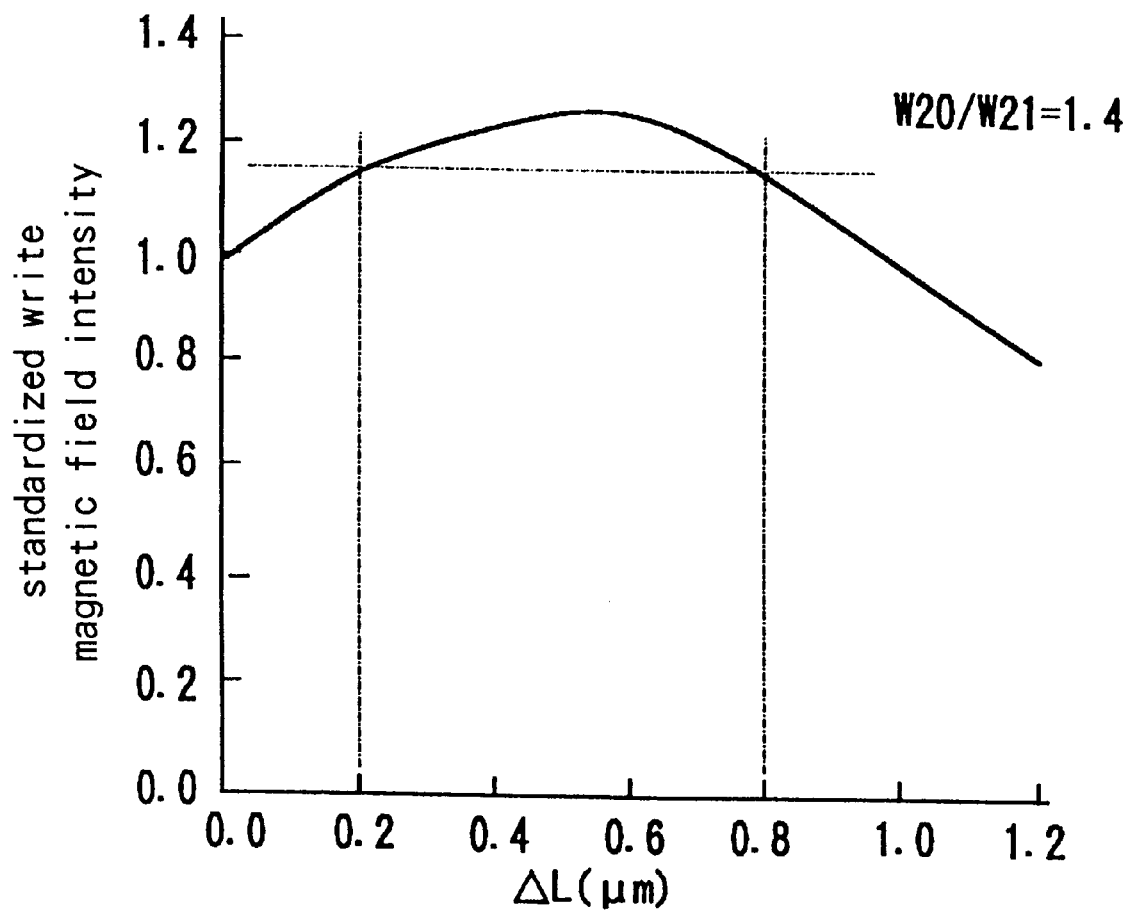
FIG. 13 is a graph illustrating the relationship between the receding quantity $\Delta$L and the standardized write magnetic field intensity.

FIG. 13 presents data illustrating the relationship between the receding quantity ΔL and the standardized write magnetic field intensity. The data presented in FIG. 13 were obtained by setting the width ratio (W20/W21) at 1.4. The data in FIG. 13 indicate that write magnetic field intensity characteristics that achieve an upward arching curve are obtained within the range of 0.2≦ΔL≦0.8 to assure a high write magnetic field intensity. As the receding quantity ΔL becomes less than 0.2, the standardized magnetic field intensity becomes drastically reduced. As the receding quantity ΔL becomes larger than 0.8, the write magnetic field intensity becomes reduced remarkably, too. Although not shown, data indicating a similar tendency to that in FIG. 13 were obtained with the width ratio (W20/W21) set at 1.2 and 1.8.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

What is claimed is:

1. A thin film magnetic head having at least one write element for writing on a medium, comprising:

a first pole portion having a first magnetic film and a second magnetic film;

a second pole portion; and a gap film provided between said first pole portion and said second pole portion, said second pole portion having a third magnetic film and a fourth magnetic film, said third magnetic film being adjacent to said gap film, said fourth magnetic film being adjacent to said third magnetic film, wherein said fourth magnetic film includes a first portion including a surface facing the medium and extending from the surface to a point a predetermined distance from the surface, and a second portion starting from the point and extending further from the surface, wherein in said first portion said fourth magnetic film gradually increases in width from adjoining edges of said third magnetic film and said fourth magnetic film to form at least one angle smaller than 90° relative to a plane through the adjoining edges, and wherein in said second portion said fourth magnetic film increases in width along the plane through the adjoining edges.

2. The thin film magnetic head of claim 1, wherein said second magnetic film is adjacent to said gap film and said first magnetic film is adjacent to said second magnetic film.

3. The thin film magnetic head of claim 1, further comprising:

an MR read element including a first shield film, a second shield film, and an MR film provided between said first shield film and said second shield film, said second shield film constituting said first magnetic film of said write element.

4. The thin film magnetic head of claim 1, wherein said angle is equal to or larger than 45°.

5. The thin film magnetic head of claim 1, wherein at least one surface of said fourth magnetic film has a hexagonal shape.

* * * * *